US006231108B1

(12) United States Patent
Nicol

(10) Patent No.: US 6,231,108 B1
(45) Date of Patent: May 15, 2001

(54) SUN VISOR EXTENSION

(76) Inventor: Blanche D. Nicol, 5233 White Ave., Port Charlotte, FL (US) 33981-2024

( * ) Notice: Subject to any disclaimer, the term of this patent is extended or adjusted under 35 U.S.C. 154(b) by 0 days.

(21) Appl. No.: 09/523,771

(22) Filed: Mar. 11, 2000

(51) Int. Cl.$^7$ .................................................. B60J 3/00
(52) U.S. Cl. ........................ 296/97.6; 296/97.5; 296/97.8
(58) Field of Search ................................. 296/97.5, 97.6, 296/97.8

(56) References Cited

U.S. PATENT DOCUMENTS

| | | |
|---|---|---|
| 2,118,198 | 5/1938 | Hathaway . |
| 2,201,197 * | 5/1940 | Minor . |
| 2,382,875 | 8/1945 | Handley . |
| 2,432,674 * | 12/1947 | Office . |
| 2,629,626 | 2/1953 | Ziler . |
| 2,833,591 | 5/1958 | Kurtzke . |
| 2,839,860 * | 6/1958 | Fry . |
| 2,842,395 | 7/1958 | Davis . |
| 3,026,999 * | 3/1962 | Constantino . |
| 3,208,792 | 9/1965 | Martin . |
| 3,480,322 | 11/1969 | Pollak . |
| 3,617,088 | 11/1971 | Graham . |
| 3,649,068 * | 3/1972 | Moynihan ........................ 296/97 C |
| 3,809,428 * | 5/1974 | Cohen ............................. 296/97 C |
| 3,948,554 | 4/1976 | Barbee . |
| 4,169,552 * | 10/1979 | Lichtenstein et al. ............ 296/97 C |
| 4,736,979 | 4/1988 | Harvey . |
| 4,776,628 | 10/1988 | Polito . |
| 5,651,577 * | 7/1997 | Lacy et al. ....................... 296/97.6 |
| 5,882,059 * | 3/1999 | Romero .......................... 296/97.6 |

* cited by examiner

Primary Examiner—D. Glenn Dayoan
Assistant Examiner—Mickki D. Murray
(74) Attorney, Agent, or Firm—Charles J. Prescott

(57) ABSTRACT

A sun visor extension for a vehicle sun visor having a distal edge and a distal end thereof. The visor extension includes an elongated substantially flat sleeve formed of two generally rectangular panels attached together along each common side margin and open at each end of the sleeve. The sleeve has a width substantially wider than that of the sun visor and a length substantially no greater than that of the sun visor whereby the extension is adjustably slidable lengthwise on the sun visor and is laterally slidable to extend the distal edge of the sun visor downwardly when in use to increase eye shading for the driver or passenger of the vehicle. Mating two-part VELCRO along one side margin provides releasable attachment between the corresponding side margins of the panels to facilitate installation.

2 Claims, 2 Drawing Sheets

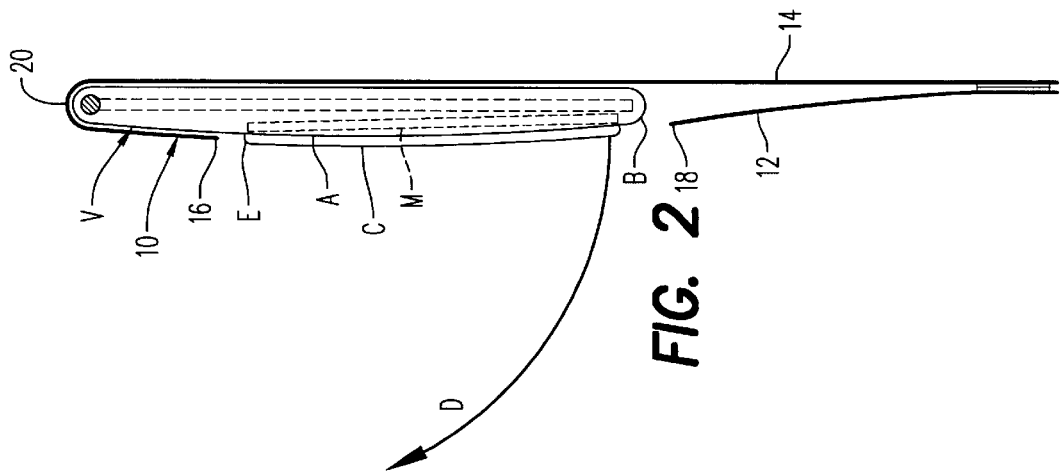
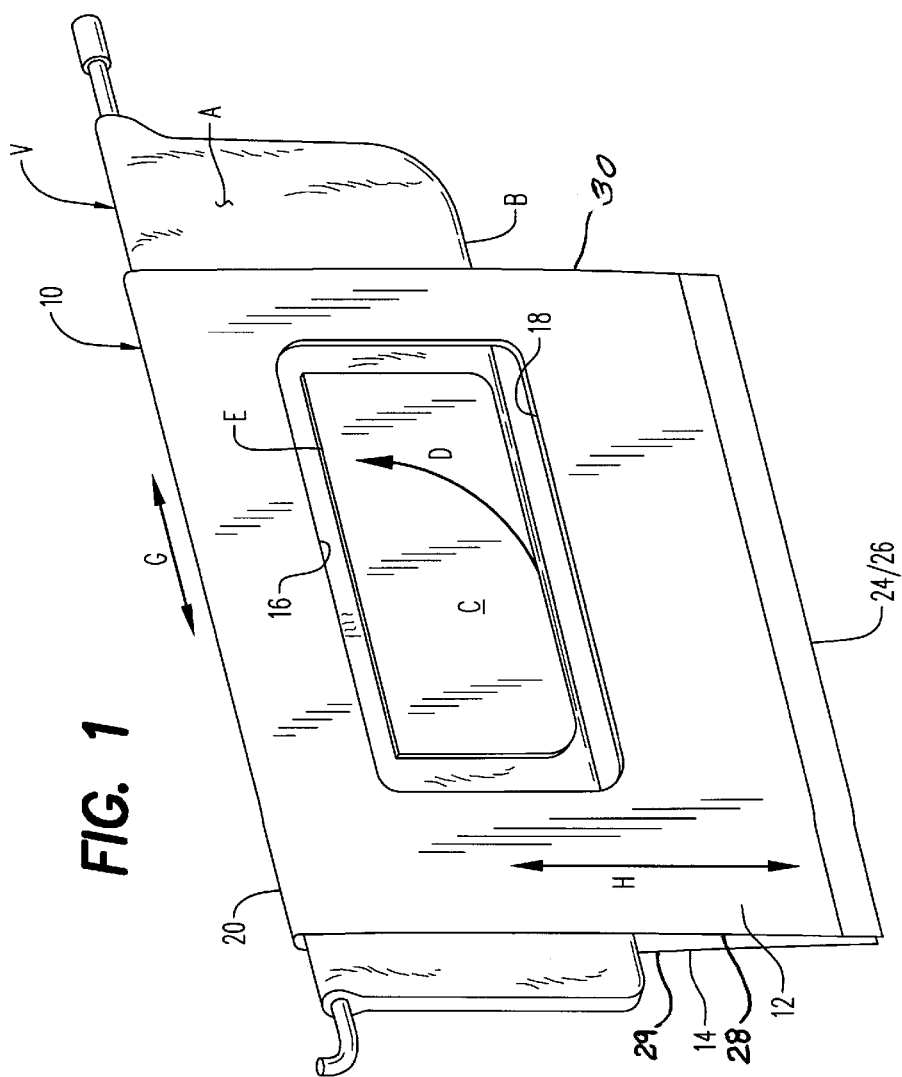

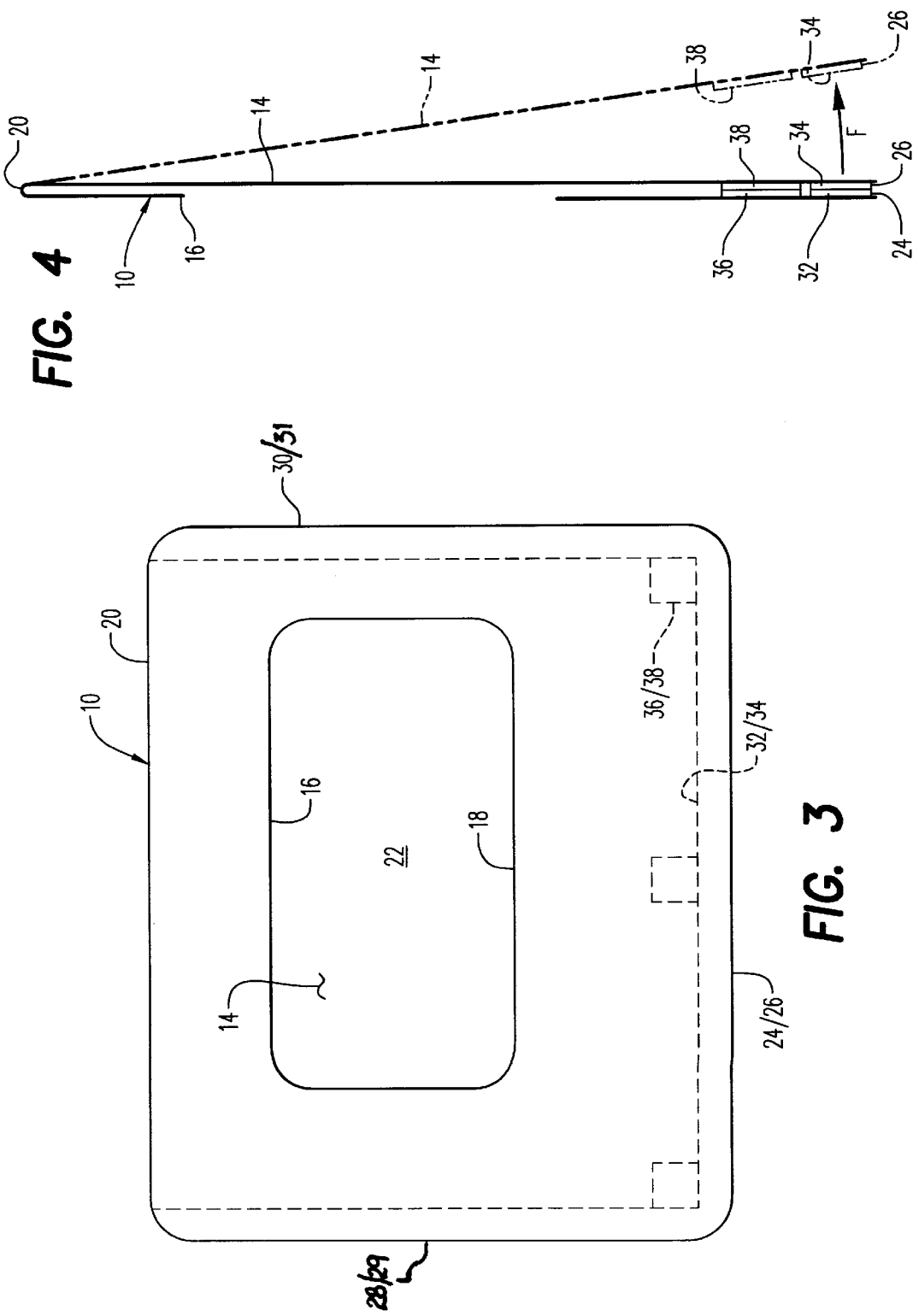

SUN VISOR EXTENSION

BACKGROUND OF THE INVENTION

1. Scope of Invention

This invention relates generally to vehicle sun visors, and more particularly to an economically manufactured and easily deployable sun visor extension which also accommodates vanity mirror usage.

2. Prior Art

Conventional vehicle sun visors are rarely sufficient for fully effective use. The following U.S. Patents are known to applicant which disclose some form of an extension for or an enhancement of a vehicle sun visor:

U.S. Pat. No. 2,118,198 to Hathaway
U.S. Pat. No. 2,382,875 to Handley
U.S. Pat. No. 2,629,626 to Ziler
U.S. Pat. No. 2,833,591 to Kurtzke
U.S. Pat. No. 3,208,792 to Martin
U.S. Pat. No. 2,842,395 to Davis
U.S. Pat. No. 3,480,322 to Pollak
U.S. Pat. No. 3,617,088 to Graham
U.S. Pat. No. 3,948,554 to Barbee
U.S. Pat. No. 4,736,979 to Harvey
U.S. Pat. No. 4,776,628 to Polito The glare shield taught by Hathaway in the '198 patent is directed to a panel which is pivotally connected to the distal edge of the visor and having an elongated narrow aperture or slot formed therethrough to reduce glare.

In the '875 patent to Handley, the antiglare device disclosed there includes an anti-glare semitransparent panel attached and laterally extending from one side margin of a sleeve which closely slidably engages over the sun visor. The sleeve provides large opaque areas for advertisement, car information, a calendar and other viewable indicia printed thereon.

Ziler in '626 patent teaches a sun-stop visor attachment which spans between spaced apart sun visors of a vehicle. An auxiliary sun visor is taught in the '591 patent invented by Kurtzke which discloses a diffusing transparent panel which is slidably positionable on elastic straps wrapped around the sun visor itself.

A sun visor attachment invented by Martin as disclosed in the '792 patent provides a clip fastening member for attachment to the upper or pivotal side margin of a sun visor and a slidably engagable tongue-and-groove arrangement to facilitate lowered positioning of a transparent or opaque plastic material as described. Davis also discloses a sun visor extension in the '395 patent showing a pivotal connection between one of its panels attached against the sun visor and the other which, in the lowered position, effectively extends the visor lower margin for eye protection.

Yet another sun visor extension invented by Pollak in the '322 patent teaches a uniquely foldable slip-over visor extension formed as a sleeve of either opaque or transparent material with cut-offs in the upper margin facilitating the sleeve slipping over a sun visor. In U.S. '088, Graham teaches yet another sun visor extender in the form of a sleeve which encompasses the sun visor and can be moved downwardly and sidewards thereon to cover additional areas not normally covered by the sun visor.

Still another vehicle sun visor attachment is shown in the '554 patent by Barbee teaching a lens removably mounted on clamps that secure the lens on the visor. The auxiliary sun visor of Harvey, in '979 patent, includes a light shield which is selectively positionable in such a way as to cover the most objectionable light source within the user's field of vision while maintaining unaltered vision in the areas adjacent to that light source.

Lastly, Polito, in U.S. '628 discloses yet another sun visor extension slidably attachable to the sun visor and being capable of both longitudinal and transverse adjustment on the sun visor via mating slotted and tabbed two part panel structure.

The present invention teaches an economically manufactured sun visor extension in the form of a sleeve which is no longer than the length of the sun visor and having a width substantially larger than that of the sun visor for downward extension of the distal margin of the sun visor. The present invention also includes one VELCRO attached side margin to facilitate deployment over the sun visor and further includes an aperture formed centrally through one of the two panels of the sleeve which facilitates ready unobstructed access to a vanity mirror with a pivotal closure panel, now a very popular vehicle feature.

BRIEF SUMMARY OF THE INVENTION

This invention is directed to a sun visor extension for a vehicle sun visor having a distal edge and a distal end thereof. The visor extension includes an elongated substantially flat sleeve formed of two generally rectangular panels attached together along each common side margin and open at each end of the sleeve. The preferred embodiment is formed as a single sheet folded lengthwise in half so that one side margin is defined by the fold. The sleeve has a width substantially wider than that of the sun visor and a length substantially no greater than that of the sun visor whereby the extension is adjustably slidable lengthwise on the sun visor and is laterally slidable to extend the distal edge of the sun visor downwardly when in use to increase eye shading for the driver or passenger of the vehicle. Mating two-part VELCRO along one unconnected side margin provides releasable attachment between the corresponding side margins of the panels to facilitate installation.

It is therefore an object of this invention to provide an economically manufactured sun visor extension for effectively extending the lower distal margin of a sun visor.

It is yet another object of this invention to provide an easily deployable sun visor extension which is easily adjustable longitudinally and laterally with respect to the sun visor.

Yet another object of this invention is to provide a sun visor extension which does not obstruct free usage of a vanity mirror of the sun visor while the device is in position for ready use.

In accordance with these and other objects which will become apparent hereinafter, the instant invention will now be described with reference to the accompanying drawings.

BRIEF DESCRIPTION OF THE DRAWINGS

FIG. 1 is a perspective view of the invention deployed and ready for use on a sun visor having a vanity mirror.

FIG. 2 is a simplified cross sectional view of FIG. 1.

FIG. 3 is a side elevation view of the invention of FIG. 1.

FIG. 4 is a simplified end elevation view of FIG. 3 showing the rear panel in a closed configuration in solid line and an opened position in phantom.

DETAILED DESCRIPTION OF THE INVENTION

Referring now to the drawings, the invention is shown generally at numeral 10 in its deployed ready-for-use position on a vanity mirror V in FIGS. 1 and 2. The vanity mirror V includes a padded panel A having a distal side margin B and also having a vanity mirror M accessible by opening cover C pivotally outwardly in the direction of arrow D about an upper margin E of the cover C. Most modem cars include such a vanity mirror M which typically also includes side lighting for better viewing within the vehicle. The cover C and the vanity mirror M are typically positioned centrally on the sun visor panel A as determined by each vehicle manufacturer.

The sun visor extension 10 is formed of a single pliable heavy paper sheet which is folded longitudinally thereof to define one side margin 20 thereof. The opposite free side edges 24 and 26 of each of the panels 12 and 14, respectively, are unconnected, but made releasably connectable by two-part mating hook and loop (VELCRO) segments 36/38, respectively. Each panel 12 and 14 is strengthened and made more durable by folding and adhesively securing edge flaps shown typically at 32/34 which extend along lower side margins 24/26 and unconnected end margins 28/29 and 30/31 as well. One panel 12 further includes a relatively large aperture 22 formed centrally therethrough. This aperture 22 is at least as long in length and width as that of the vanity mirror cover B.

To deploy the invention 10, the mating two-part VELCRO patches 36/38 are detached one from another in the direction of arrow F in FIG. 4 to facilitate positioning the invention 10 as shown in FIG. 1. Thereafter, the VELCRO two-part members 36/38 are reattached by simply squeezing them together manually.

Once positioned as shown in FIG. 1, the visor 10 is easily adjustable lengthwise or longitudinally to the visor V in the direction of arrow G and laterally in the direction of arrow H so as to adjustably position the lower side margins 24/26 as desired with respect to the distal edge B of visor V. In the in-use position shown, the visor cover C is clearly openable in the direction of arrow D without interference from the invention 10 and without compromising the useful effectiveness of the invention 10. Thus, when in use, the upper and lower margins 16 and 18, respectively, of the visor opening 22 provide clear, unobstructed access to the visor cover C and a mirror M concealed therebehind.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A vehicle sun visor extension, the sun visor of the type having a vanity mirror accessible via a pivotably openable cover and positioned centrally on the sun visor, the sun visor also having a distal edge and a distal end thereof, comprising:

an elongated substantially flat sleeve formed of a rectangular panel folded in half to form two substantially equally sized panels and a continuous uninterrupted side margin therebetween, said sleeve open at each end margin thereof, wherein each panel including a folded edge flap formed coextensive with each said distal end and said distal side margin thereof for enhanced strength and durability;

one said panel including an aperture of sufficient size and location on said one panel to provide access to the vanity mirror by pivotal opening of the cover through said aperture, said panels releasably connectable together along mating distal side margins thereof;

said sleeve having a width substantially greater than that of the sun visor and a length no greater than that of the sun visor thereby allowing said sleeve to be slidable lengthwise on the sun visor onto a distal end of the sun visor and up to, but not beyond a proximal supported end of the sun visor, and laterally to extend the distal edge of the sun visor downwardly to increase eye shading for a driver or a passenger of the vehicle and to optimally align said aperture to the cover for access to the mirror.

2. A vehicle sun visor extension, the sun visor having a distal edge and a distal end thereof and including an openable vanity mirror positioned centrally on one surface of the sun visor, comprising:

an elongated sleeve formed of two generally rectangular flat panels attached together and positioned against one another along a common uninterrupted side margin therebetween and open at each end of said sleeve;

said sleeve having a width substantially greater than that of the sun visor and a length no greater than that of the sun visor;

whereby said sleeve is slidable lengthwise on the sun visor and is laterally slidable to effectively extend the distal edge of the sun visor downwardly when in use to increase eye shading for a driver or a passenger of the vehicle;

one said panel including an aperture of sufficient size and location on said one panel to provide opening access to the vanity mirror when said sleeve is selectively moved laterally and longitudinally on the sun visor to align said aperture over the vanity mirror;

said panels along aligned distal side margins thereof including mating two-part hook and loop material for releasable attachment between said distal side margins to facilitate installation of said extension;

each said panel including a folded edge flap formed coextensive with each said distal end and said distal side margin thereof for enhanced strength and durability.

* * * * *